(12) United States Patent
Barr (10) Patent No.: US 7,581,646 B2
(45) Date of Patent: Sep. 1, 2009

(54) PROCESS FOR SORTING GRAPE BERRIES

(76) Inventor: Edwin L Barr, C/O P & L SPecialties, 1650 Almar Pkwy., Santa Rosa, CA (US) 95403

( * ) Notice: Subject to any disclaimer, the term of this patent is extended or adjusted under 35 U.S.C. 154(b) by 0 days.

(21) Appl. No.: 12/181,509

(22) Filed: Jul. 29, 2008

(65) Prior Publication Data

US 2008/0283452 A1    Nov. 20, 2008

Related U.S. Application Data (62) Division of application No. 11/176,431, filed on Jul. 6, 2005, now abandoned.

(51) Int. Cl.
 B07B 1/00 (2006.01)
 B07B 13/00 (2006.01)
(52) U.S. Cl. ............... 209/235; 209/682; 209/243
(58) Field of Classification Search ........... 209/364, 209/274, 275, 309, 311, 315, 325, 235, 240, 209/243, 255, 370, 371, 373, 659, 660, 675–677, 209/680, 682; 198/758, 759, 766, 770, 750.8; 460/145–148; 56/330
See application file for complete search history.

(56) References Cited

U.S. PATENT DOCUMENTS

| | | | |
|---|---|---|---|
| 424,002 A | 3/1890 | Jones | 209/625 |
| 494,193 A | 3/1893 | Fabbrini | 209/248 |
| 550,998 A | 12/1895 | Nash | 209/235 |
| 1,438,905 A | 12/1922 | Dokoff | 209/349 |
| 1,989,777 A | 2/1935 | Wettlaufer | 209/17 |
| 2,703,649 A | 3/1955 | Cheyette | 209/314 |
| 2,874,841 A | 2/1959 | Peterson | 209/329 |
| 3,315,807 A | 4/1967 | Rosen | 209/315 |
| 3,362,524 A | 1/1968 | Holman | 198/609 |
| 3,567,012 A | 3/1971 | Mendoza | 198/761 |
| 4,113,626 A | 9/1978 | Detcher | 210/409 |
| 4,122,001 A | 10/1978 | Snyder | 209/675 |
| 4,301,931 A | 11/1981 | Satake | 209/691 |
| 4,385,703 A | 5/1983 | Murphy, II | 209/674 |
| 4,492,629 A | 1/1985 | Dumbaugh | 209/332 |
| 4,699,713 A | 10/1987 | Tieben | 209/315 |
| 5,045,182 A | 9/1991 | Butler | 209/240 |
| 5,064,536 A | 11/1991 | Bratten | 210/402 |
| 5,190,645 A | 3/1993 | Burgess | 210/144 |
| 5,368,167 A | 11/1994 | Howes | 209/395 |
| 5,415,294 A | 5/1995 | Nagaoka | 209/393 |
| 5,584,238 A | 12/1996 | Newton, Sr. | 99/495 |

(Continued)

*Primary Examiner*—Patrick H Mackey
*Assistant Examiner*—Mark Hageman
(74) *Attorney, Agent, or Firm*—Edward S. Sherman (57) ABSTRACT

A oscillating sorting conveyor is adapted for separating whole berries of wine grapes from undesirable components such as "shot berries" (immature grapes), stems, raisins, leaf material, bugs, pebbles and the like. The sorter deploys a downward tilting trough that is driven to oscillate. A screen is disposed at the bottom of the trough such that whole berries are conveyed over the screen while the undesirable components pass through the screen. The preferred embodiment of the screen has a non-uniform cross-section to improve the efficiency of removal the undesirable components without clogging or requiring constant maintenance. The preferred embodiment of the oscillating conveyor is driven by a cam and cam follower, in which the cam driving shaft is counterweighted to minimize vibration. The more preferred embodiments minimize damage to the grape berries while efficiently removing the undesirable components.

16 Claims, 9 Drawing Sheets

U.S. PATENT DOCUMENTS

| | | | |
|---|---|---|---|
| 5,593,582 A | 1/1997 | Roff, Jr. | 210/325 |
| 5,899,340 A | 5/1999 | MacNaughton | 209/325 |
| 6,685,029 B2 | 2/2004 | Forrest | 209/405 |
| 6,868,972 B2 | 3/2005 | Seyffert et al. | 209/254 |
| 6,988,624 B2 | 1/2006 | MacNaughton | 209/420 |

PROCESS FOR SORTING GRAPE BERRIES

CROSS REFERENCE TO RELATED APPLICATIONS

The present application is a Division of the U.S. patent application of the same title filed on Jul. 6, 2005, having application Ser. No. 11/176,431, which is incorporated herein by reference.

BACKGROUND OF INVENTION

The present invention relates to the processing of wine grapes, and more specifically to an apparatus, process and related equipment for separating wine grape berries prior to conversion into must and juice for wine making The manufacture of the highest quality wines requires the use of nearly perfect wines grapes, which are of perfect ripeness and free from foreign and extraneous matter that would lead to off flavors and/or hinder or degrade the fermentation process.

Wine grapes, being a natural agriculture product that is harvested in large commercial quantities for commercial wine making, inevitably contains some quantity of foreign or otherwise undesirable matter, be it from field contamination, so-called MOG (an acronym for "material other than grapes") or natural variation in fruit ripeness and quality as caused by weather, pestilence, genetic variation and the like. MOG may include stems or portions thereof (such as sheared stem material produced by the action of the destemming machine), leaf material, bugs, pebbles and the like.

Current industrial practice at premium commercial wineries is to employ crews that visual inspect grapes, either before or after de-stemming, in order to manually cull and remove the undesirable matter. However, hand sorting is limited in efficiency, completeness and in particular, is not practical to remove some undesirable components. Indeed it is difficult to remove by hand sorting "shot berries" (immature grapes) as well as overripe grapes or raisins, both of which although technically grape matter, adversely effect wine taste, flavor and aroma.

Accordingly, there is a need for automated equipment and processes to remove undesirable matter from wine grape berries after de-stemming.

It is therefore a first object of the present invention to provide such equipment and a process that has the general attributes of removing MOG from de-stemmed grape berries.

It is another objective of the invention to provide such equipment and a process that removes "shot berries" as well as raisins without damaging or crushing whole ripe grapes.

It is a further objective of the invention to provide the above automated process that is highly efficient at removing undesirable components, yet does so at a high throughput of grape berries.

Still yet another object of the invention is to provide such a process and equipment which is relatively easy to maintain, with minimum and infrequent downtime for cleaning or refreshing by removing the separated undesirable materials.

SUMMARY OF INVENTION

In the present invention, the above and other objects of the invention are achieved by providing an oscillating flow platform that receives the de-stemmed grapes at one end directly from a grape de-stemming machine, and then separates out the undesirable mater through a screen as the grapes are conveyed via a trough to holding tank, press or crusher.

The oscillating flow platform includes a support stand on which a trough having a screen at its bottom surface is oscillated back and forth by a motor driven cam mechanism. The screen in the preferred embodiments has a mesh pattern that facilitates remove of the undesirable MOG other matter without damaging whole grape berries.

Use of the above apparatus, with a preferred screen results in the removal of MOG, "shot berries" (immature grapes), raisins, stems, leaf material, bugs, pebbles and the like from de-stemmed grape berries, while largely maintaining the integrity of the ripe grape berries. Further, the device and method provide a high efficiency of removal at a high throughput of grape berries, yet with a minimal of maintenance downtime for cleaning or refreshing the screen.

The above and other objects, effects, features, and advantages of the present invention will become more apparent from the following description of the embodiments thereof taken in conjunction with the accompanying drawings.

DETAILED DESCRIPTION

Referring to FIGS. 1 through 10, wherein like reference numerals refer to like components in the various views, there is illustrated therein a new and improved oscillating flow platform, generally denominated 100 herein.

Figure 1:
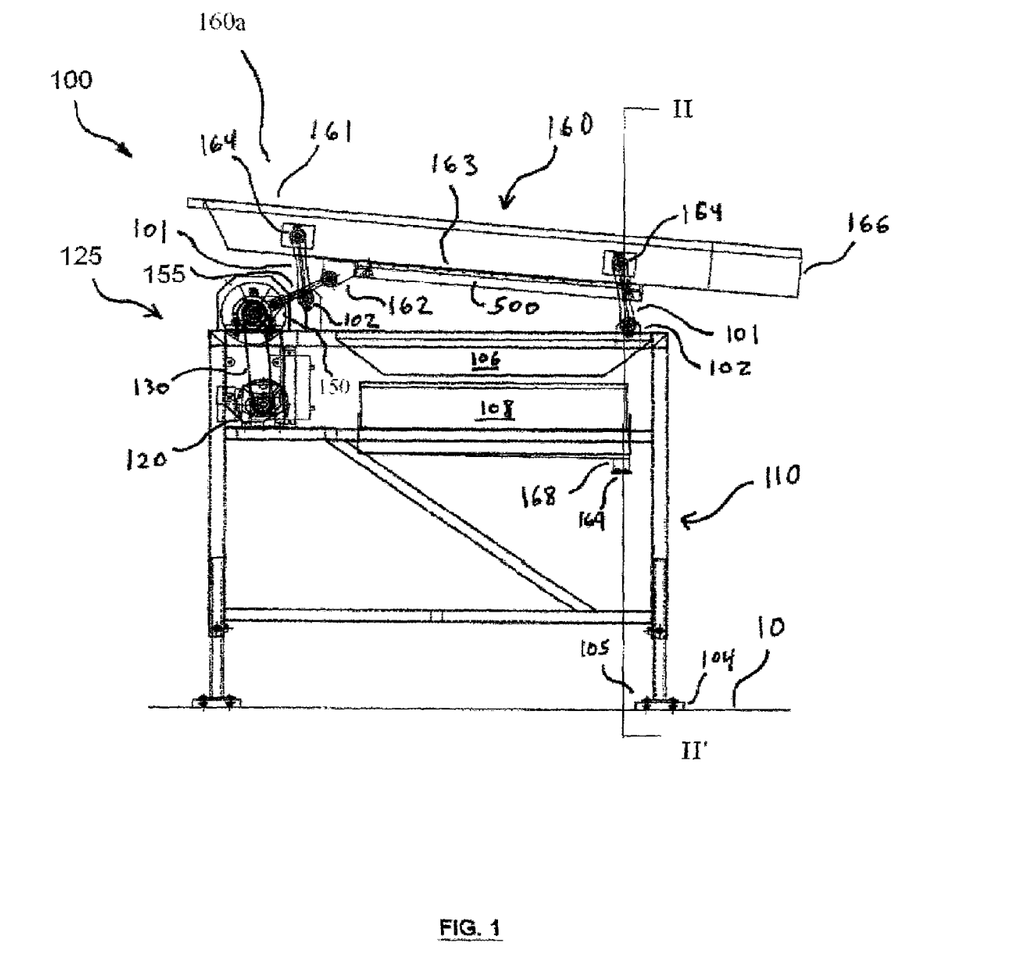
FIG. 1 is a side elevation of the oscillating flow platform.
Figure 2A:
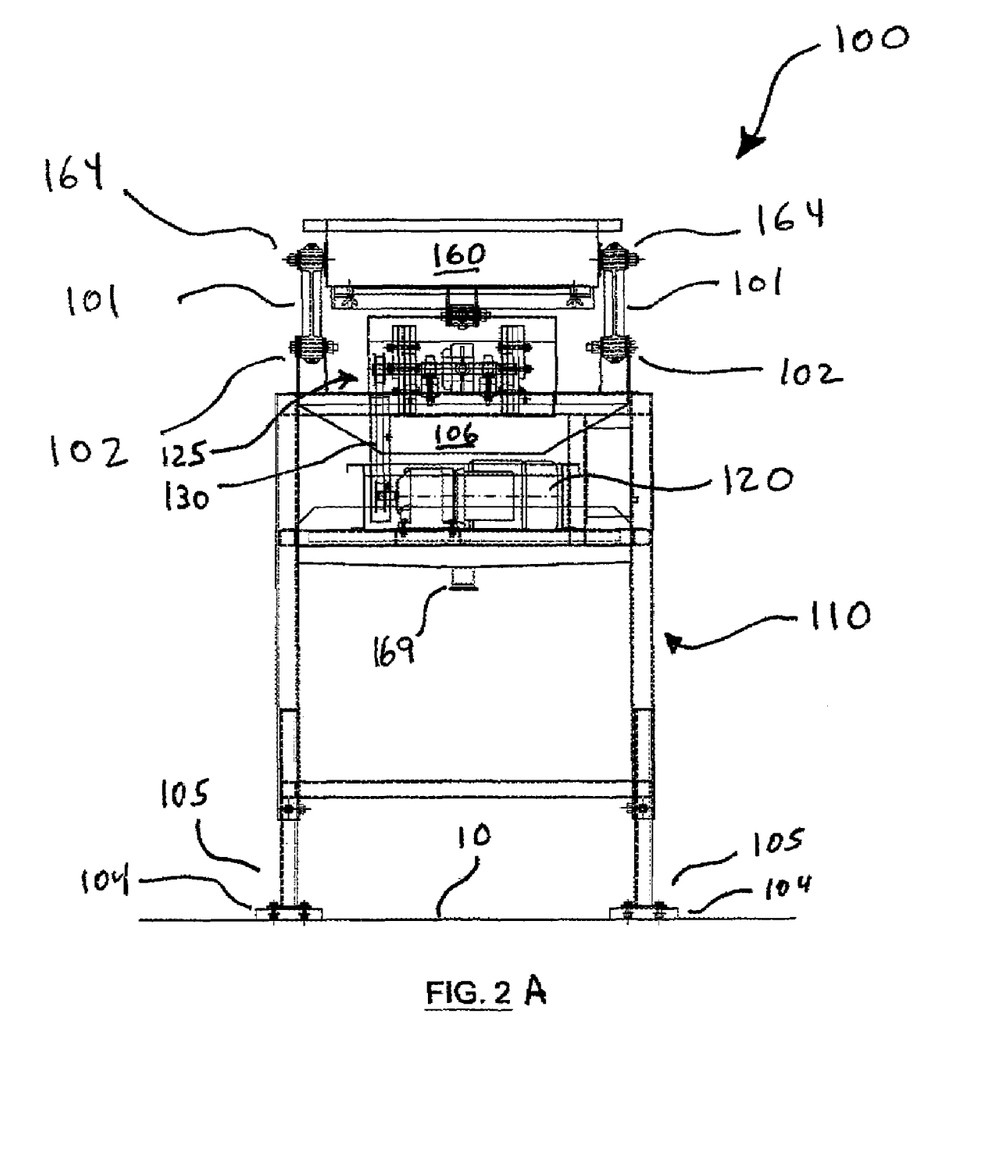
FIG. 2A is rear elevation of the oscillating flow platform.
Figure 2B:
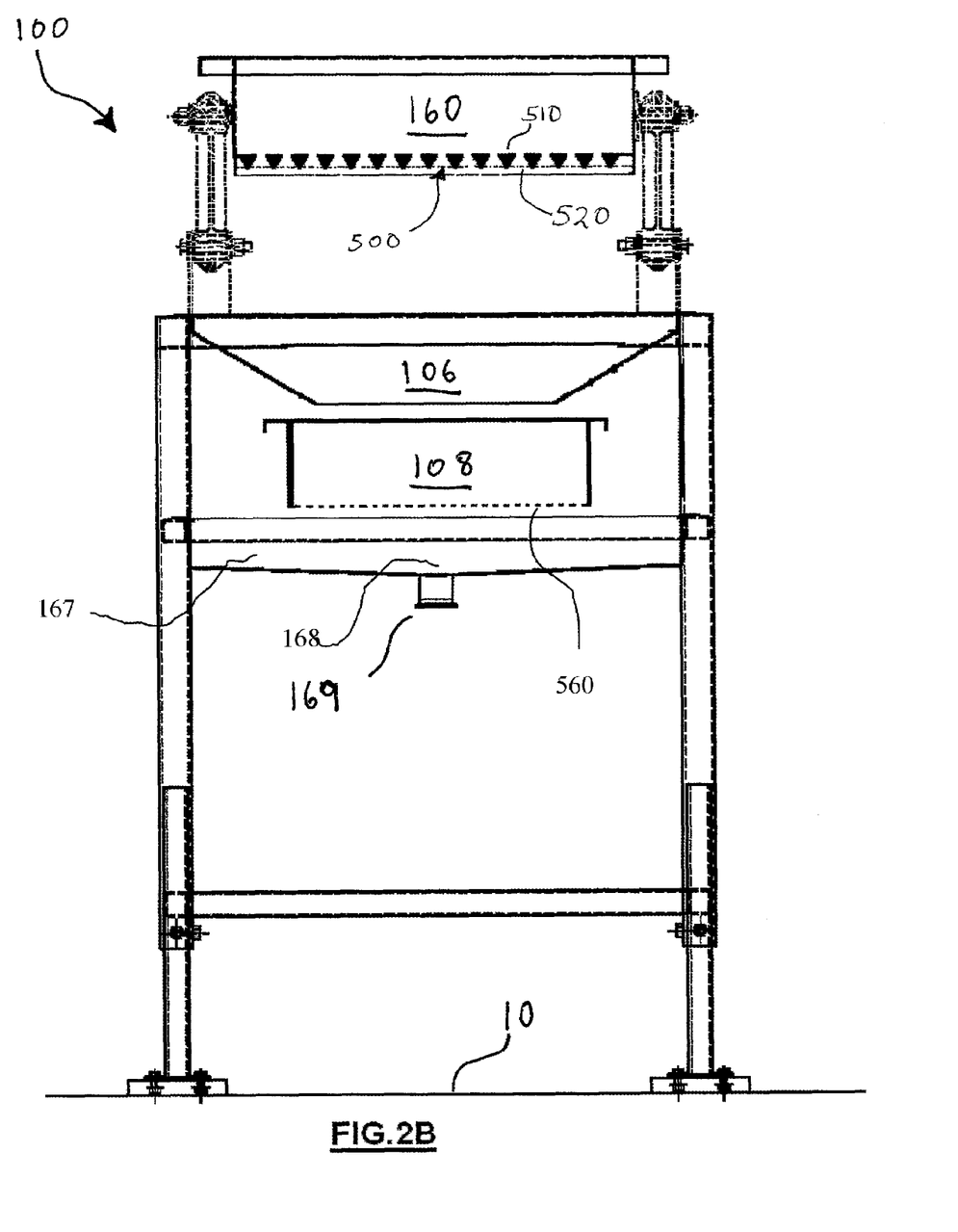
FIG. 2B is a cross-sectional elevation of the oscillating flow platform at section line II-II' in FIG. 1.
Figure 4A:
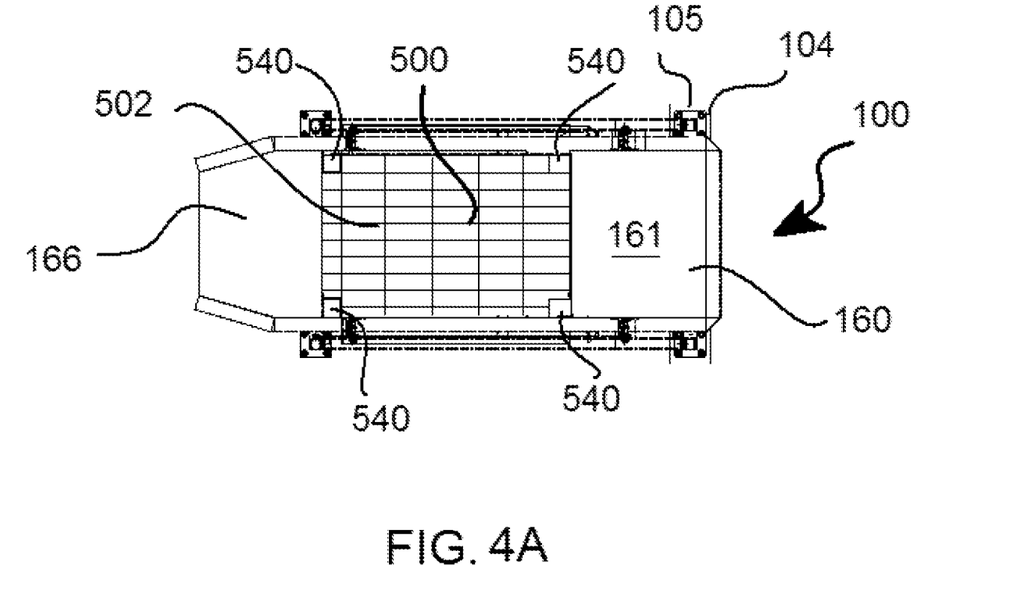
FIG. 4 is a plan view of the oscillating flow platform in FIG. 1.
Figure 4B:
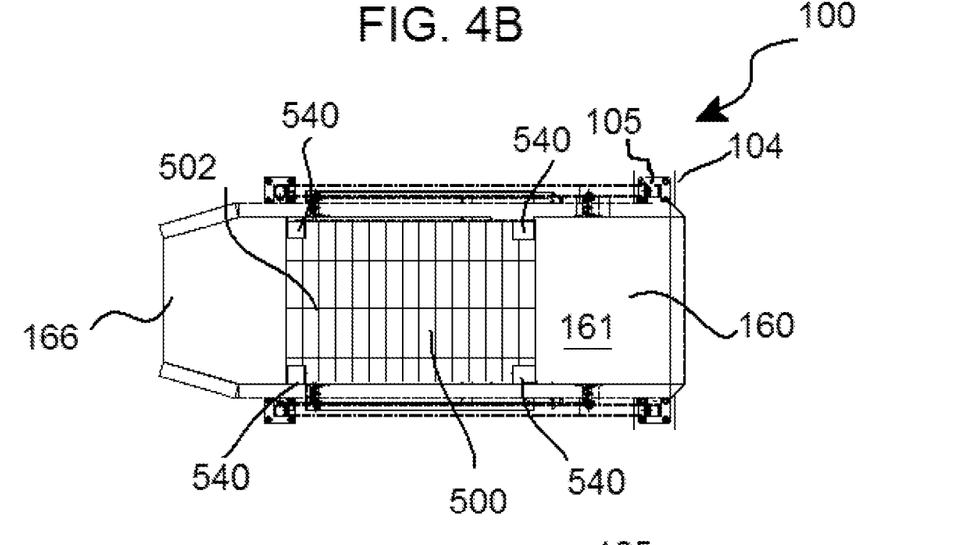

In accordance with the present invention, FIG. 1 is an exterior side elevation of oscillating flow platform 100. The platform comprises a support frame or stand 110 to which trough 160 is mounted by four pivots legs 101. The trough is tilted downward from grape receiving end 160a toward an open mouth 166. The trough has an aperture 163 that spans the midsection of the bottom surface for receiving a screen 500. Thus, in a winemaking operation oscillating flow platform 100 receives grape berries at end 160a after de-stemming. As trough 160 oscillates in the plane of FIG. 1, about the four pivot legs 101, the de-stemmed grape berries and MOG arriving from the de-stemmer are agitated as they flow downward with gravity toward open mouth 166. Open mouth 166 is preferably tapered inward, as shown in FIG. 4, so that the still oscillating berries are directed into the next conveyor, storage or process vessel in the winemaking process.

The agitation induced by the oscillating trough 160 results in multiple opportunities for the MOG, raisins and shot berries to contact and pass through screen 500. In contrast, the larger whole berries, being bigger than the slots in the screen 500, pass over it and exit the trough 160 at open mouth 166. As will be further described with respect to FIG. 5-8, the screen 500 is configured such that whole berries pass over the screen while the majority of the undesirable mater falls through the screen. As a preferred embodiment, the trough has a solid area 161 for receiving de-stemmed grapes before entry to screen area. Initially dispensing grape berries on the solid area 161 has been discovered to result in a lower yield of juice being produced by the rupture of berries during the separation process. While the percentages of berries that rupture during the separation process is small, it can be significant for winemakers that plan to use a carbonic maceration process during the initial stages of fermentation, wherein fermentation initially occurs within the whole, un-ruptured berries. Further, avoiding the rupture of berries also minimizes the possibility that a portion of the grape juice will become oxidized before the start of fermentation.

The matter passing through screen 500 is directed by funnel trough 106, placed there under, into a removable open box-like catch basin 108. Catch basin 108 has a secondary screen 560 its bottom surface. Secondary screen 560 has a finer mesh pattern than screen 500 so that solid MOG is now retained, but grape juice generated from broken berries passes through, to be collected in the underlying secondary trough 167. Secondary trough 167 has a solid bottom surface that tapers toward a drain hole 168 and connected drain pipe 169. Thus, any juice produced by rupturing the grape berries, either during the de-stemming process or separation of MOG in oscillating flow platform 100, is readily removed and collected via a hose line or bucket placed under drain 168. Catch basin 108 rests on secondary trough 167 so that it is readily removed therefrom to periodically disposed of the solid materials separated from the grape berries by screen 500. It should be appreciated that catch basin 108 need not be limited to a discrete fixed member as illustrated, but in other embodiments may take the form of a screen conveyer belt so that that MOG, raisins and shot berries are continuously removed from the apparatus, before they have a chance to accumulate as they would in the discrete catch basin 108 illustrated herein.

Trough 160 is oscillated about the four pivot legs 101 via motor 120 and drive assembly 125. The upper ends of the pivot legs 101 are connected to trough 160 via upper bearings 164, whereas the lower ends of the pivot legs 101 are connected to trough 160 via lower bearings 102. The upper 164 and lower 102 bearing structures are preferably bushings, but are alternatively a roller bearing, a ball bearing and the like.

The motor 120 and drive assembly 125 are mounted to support frame 110 just below the upper end 160a of the trough 160. The oscillation frequency of trough 160 is readily varied to suit the characteristics of the grape variety being treated by modulating the speed of motor 120 via frequency drive controller 125. Frequency drive controller 125 allows the user to control the speed of electric motor 120 by modulating the applied current.

Figure 3A:
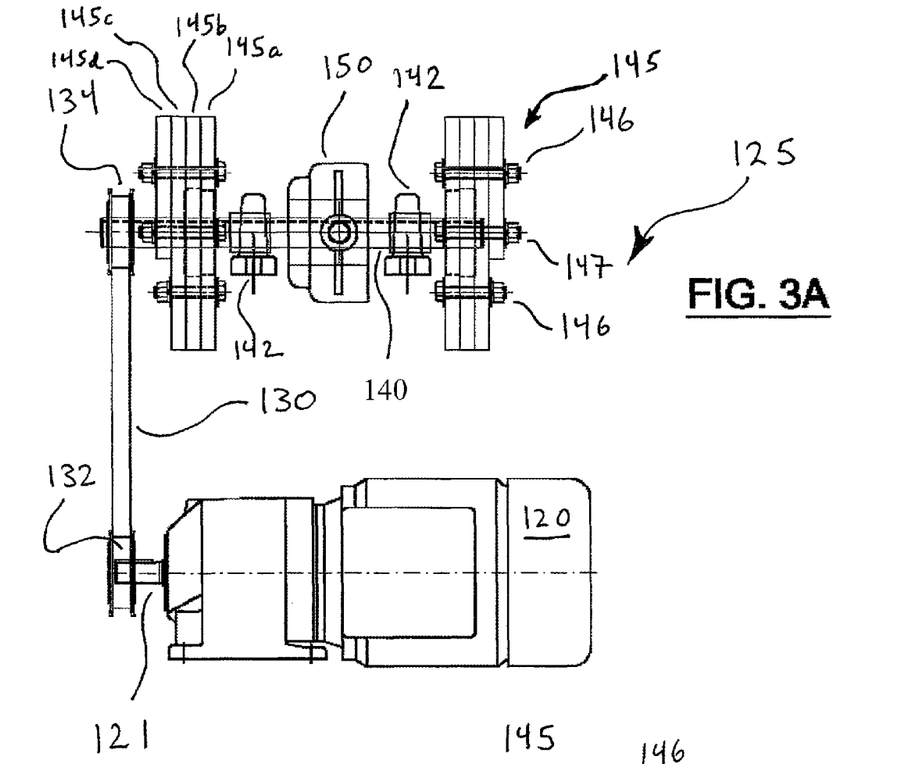
FIG. 3A is a detailed view of a portion of the rear elevation in FIG. 2 to illustrate the powered drive mechanism of the oscillating flow platform.
Figure 3B:
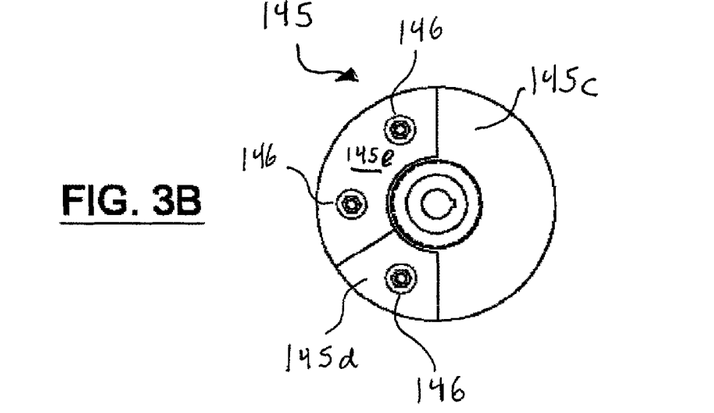
FIG. 3B is a side elevation of a portion of the power drive mechanism of FIG. 3A.

As shown in further detail in FIGS. 3A and 3B, drive assembly 125 also comprises a drive shaft 140 supported for free rotary motion within a pair of block bearing 142, which are mounted to frame 110. A drive belt 130 is mounted at one end to surround the belt sleeve 132 attached to the motor drive shaft 121. The opposite end of drive belt 130 is wrapped to surround drive shaft belt sleeve 134. Thus, the rotation of motor 120 rotates drive shaft 140 via drive belt 130. Laterally disposed about the center of drive shaft 140 is a cam 150. The cam 150 has a cam follower 155 attached, which extends perpendicular to drive shaft 140. The cam follower 155 is coupled to the cam 150 to oscillate back and forth along its principle axis as the cam surface is displaced in the same direction with every rotation of drive shaft 140. The other end of the cam follower 155 is attached via the rotary coupling of central bearing block 162 (shown in FIG. 1) to the bottom of trough 160, just forward of screen aperture 163. Thus, as the cam 150 rotates eccentrically with respect to drive shaft 140, the cam follower 155 is driven to oscillate in the plane of FIG. 1 and likewise drives trough 160 to oscillate in the same plane via pivoting legs 101.

Still referring now to FIGS. 3A and 3B, further details of the preferred embodiment of the drive system 125 will now be described. Drive shaft 140 has at each end, outward of cam 150 and block bearings 142, a pair of drive shaft counterweight assemblies 145. An external side elevation of the drive shaft counter weight assembly 145 is shown in FIG. 3B.

It should be appreciated that support stand 110 is attached to or rests on the ground via stand feet 105. The stand support feet terminate in rubber damping pads 104 which contact the supporting floor or ground surface 10 to minimize vibration transmitted from the oscillatory motion of the trough 160. However, it has been discovered that the counterweight assembly 145 vastly minimizes such vibration. In the most preferred embodiment, the counter weight is configured to provide a non-uniform radial distribution of weight with respect to the axis of drive shaft 140. The weight is distributed such that the center of gravity of each counterweight assembly 145 is directly on the opposite side of drive shaft 140 from cam 150 and cam follower 155.

In FIG. 3B the drive shaft counterweight assembly 145 is shown as composted of two disks segments (145a and 145b) and two annular segments (145c and 145d) secured together by common bolts 146 bolted together. However, each counterweight assembly can also be constructed as a monolithic component. Each counterweight assembly 145 is preferably secured to the end of drive shaft 140 as shown by end bolt 147. The non-uniform radial distribution of counter weight 145 is provided in this embodiment by the stacking two wedge shaped segments 145d and 145e. The two wedge shaped segments 145d and 145e affixed to the other portions of counterweight assembly on the end of drive shaft 140 such that center of gravity of the counterweight assembly 145 with respect to drive shaft 140 is opposed to the center of gravity of cam 150. The preferred masses of counterweights 145a-e are 6, 3, 3 and 1.5 pound respectively, for a total mass of 13.5 pounds on each side of drive shaft 140.

Reducing vibration of oscillating flow platform 100 not only reduces noise to nearby workers, but also greatly reduces the tendency for the unit to move during use, and is expected to generally extend the useful product life. Without wishing to rely on theory, it is believed that as vibration is reduced with counterweight assembly 145 there is also a more efficient coupling of the rotary motion of motor 120, into the oscillatory motion of trough 160, increasing the potential throughput of whole berries in trough 160 while maintaining the high separation yield of undesirable material through screen 500.

Figures 7, 8:
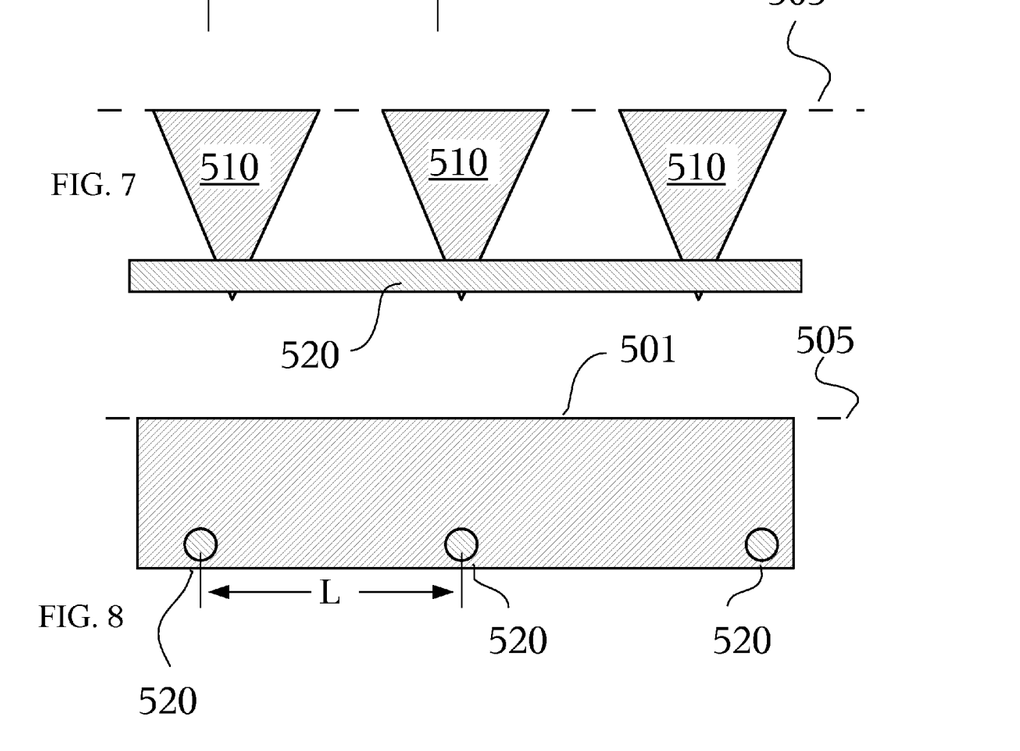
FIG. 7 is a second cross sectional elevation of section VII-VII' of the screen in FIG. 5B.
FIG. 8 is a side cross-sectional elevation of section VIII-VIII' of the screen in FIG. 5B.

The optimum construction and function of screen 500 is more fully described below with respect to FIG. 5-9. However, it should be appreciated that one method of mounting screen 500 in aperture 163 is with the long axis of the slots 502 parallel with the principle axis of the trough 160; oriented to incline downward with the trough 160. An alternative method of mounting a different screen, shown in FIG. 9, results in the long axis of the slots 502' oriented perpendicular to the principle axis of the trough 160. Referring now to the first embodiment shown in FIG. 5, screen 500 has a rectangular frame 530. Inset and connected to each interior corner of frame 530 are four solid rectangular mounting corners 540. Each mounting corner 540 has a stud 541 for receiving a wing nut assembly (not shown) for secure attachment to the trough 160 to fill aperture 163. The remainder of the screen 500 within frame 530 is formed from an interconnected array of triangular shafts and wires. The spacing between the shafts is less than that between the wires to define the array of rectangular slots 502. Thus, connected to opposing sides of the frame 530 is a parallel array of triangular shafts 510, each shaft being oriented so that sides of equal width define a common plane 505 at the entrance side of screen 500, as shown in section VI-VI', in FIG. 6. The wires within parallel array 520 are connected at the ends to other pair of opposing sides of frame 530. Each wire in the parallel 520 is connected to each of the triangular shafts in array 510 that it traverses so as to stabilize the entire parallel ray of shafts. As shown in FIG. 7, corresponding to section line VII-VII' in FIG. 5, it can be seen that each wire connects to the traversing triangular shaft at the apex thereof, opposite the side that defines a portion of plane 505.

In the embodiment of screen 500 in FIG. 5-9, it is preferable that the edge to edge spacing of the triangular shafts at the upper surface, W, within screen 500 is less than about 0.5 inches, and more preferably less than about 0.35 inches, but most preferably less than about 0.25 inches, with the orthogonal wires separated by a distance, L, of about 1.75 inches. The sides of each triangular shaft preferably has a width of about 0.25 inches wide. The wire preferably have a diameter of about 0.25 inches. Thus, in this preferred embodiment screen 500 consists of slots 502 having an aspect ratio of L/W. L/W is preferably greater than about 3, and more preferably greater than about 4, and most preferably at least about 6.

Figures 10A, 10B:
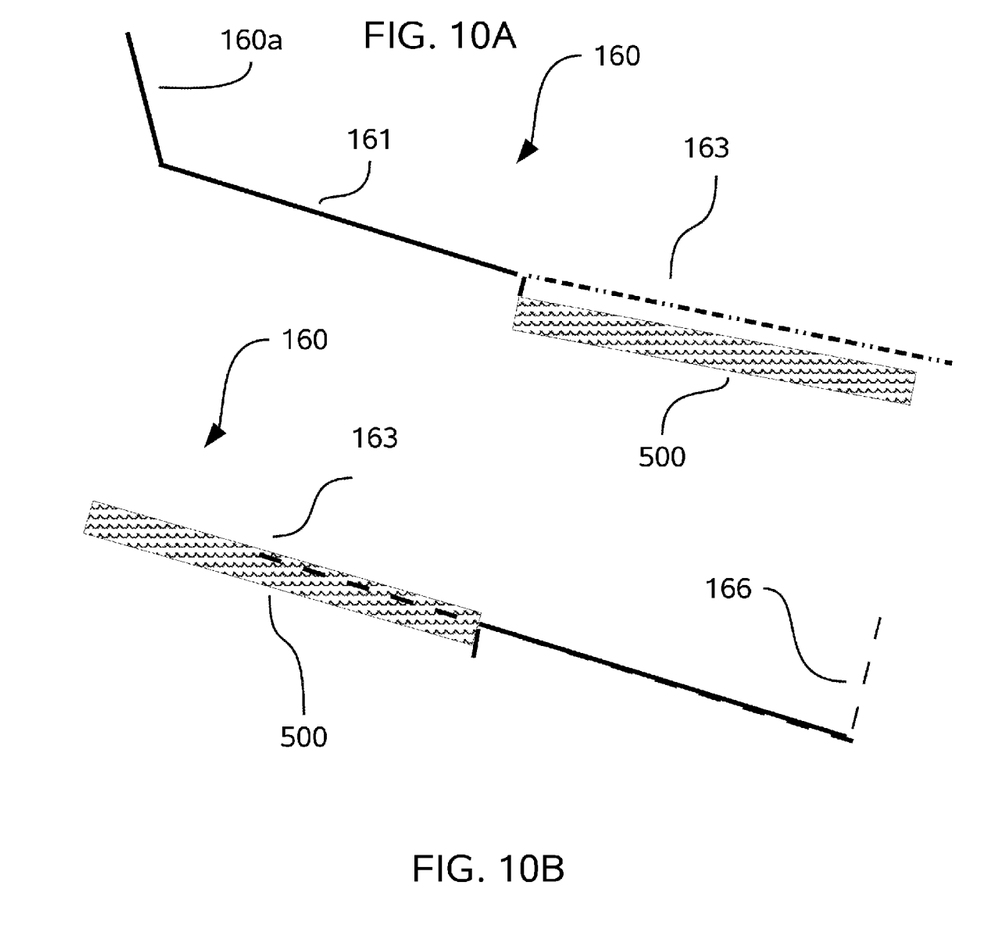
FIG. 10A is partial cross-sectional elevation of the upper end of the trough and a portion of the screen.
FIG. 10B is a partial cross-sectional elevation of the lower or open end of the trough and a portion of the screen.

In the preferred embodiment of the oscillating flow platform 100, as shown in FIG. 10A, the screen 500 is mounted with the leading edge (that is the side closer to grape receiving end 160a) depressed or at least level with the adjacent interior bottom of the trough and in FIG. 10B with the trailing edge (the side closer to open mouth 166) above or at least level with the adjacent interior bottom of the trough 160.

The screen construction shown in FIG. 5-9 has several surprising advantages for separating grapes. From the interior of the trough 160, plane 505, the screen appears to the arriving grape matter as a series of slots. The slot spacing W is narrow enough to return ripe whole berries, yet let smaller raisins, shot berries and most forms of MOG pass through. It should be noted that as the wires 520 are connected to the triangular shafts 510 near the lower and downward faxing apex, this adjacent area is wider, having a width, w, as shown in FIG. 7.

Not wishing to be bound by theory, it is currently believed that one reason for the higher throughput of screen 500 is that once MOG particles passes through aperture 501, they are unlikely to re-enter in the opposite direction. Further, the size and spacing of the triangular rods and wires is such that high aspect ratio MOG, (such as stems, twigs and insects and the like) will not collect on these members, but rather fall downward toward secondary screen 560 for catching separated MOG. Likewise, it is believed that the inverted shape of the triangular shafts 510, with the narrow opening W at the upper or entry surface at plane 505 makes it unlikely that matter vibrating free or hitting wires 520 will reverse direction and pass back up above plane 505 into trough 160. Although the wires 520 are a locus for the potential buildup of matter that passes through the gap W (between triangular shafts in plane 505), the tendency toward build-up is reduced as the inverted triangular shape of the shafts 510 provides a wider gap, w, and hence more space for such matter to tumble free of the wires 520 due to the oscillation induced vibration of the matter as it enters and then traverses screen 500.

Figure 5A:
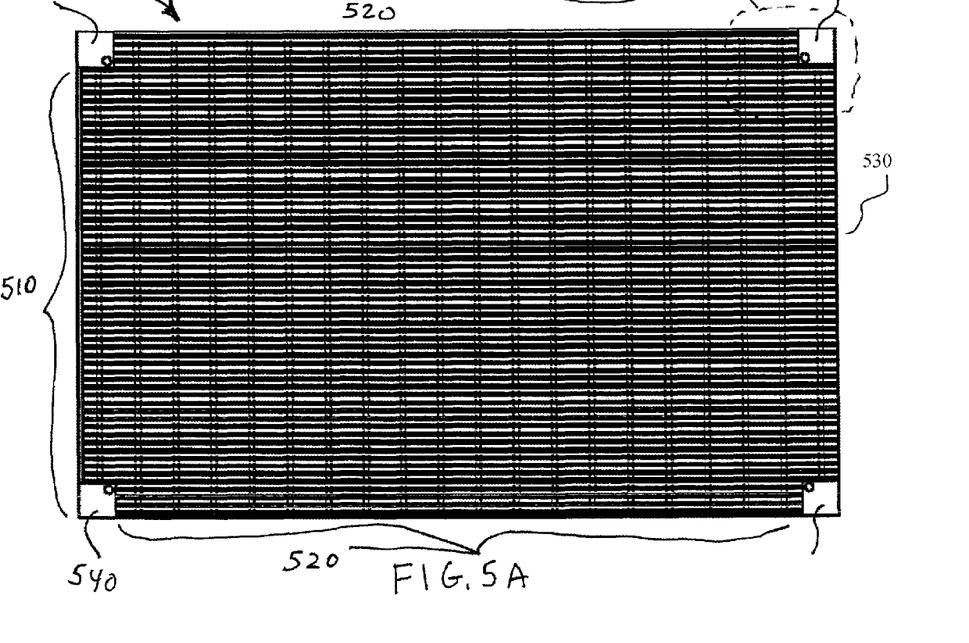
FIG. 5A is a plan view of the screen portion of the oscillating flow platform in FIG. 1.
Figure 5B:
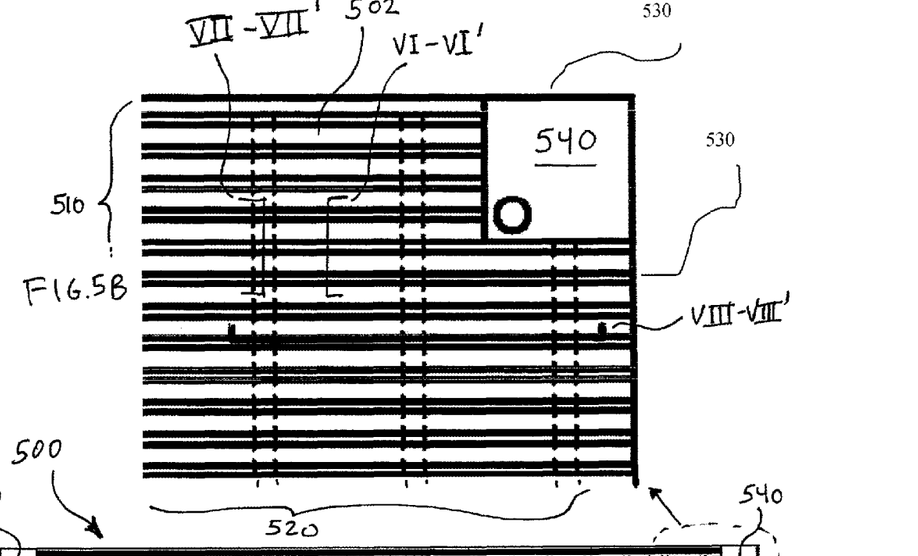
FIG. 5B is a detailed view of a portion of the plan view of FIG. 5A.
Figure 6:
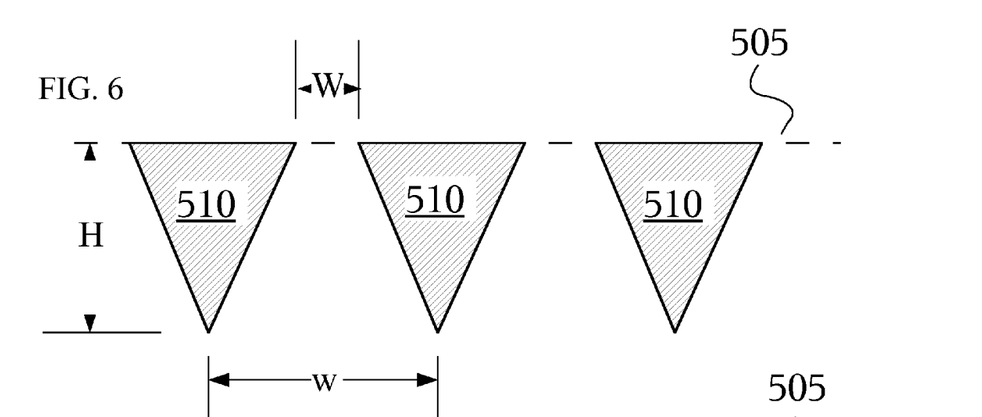
FIG. 6 is a first cross sectional elevation of section VI-VI' of the screen in FIG. 5B.
Figure 9:
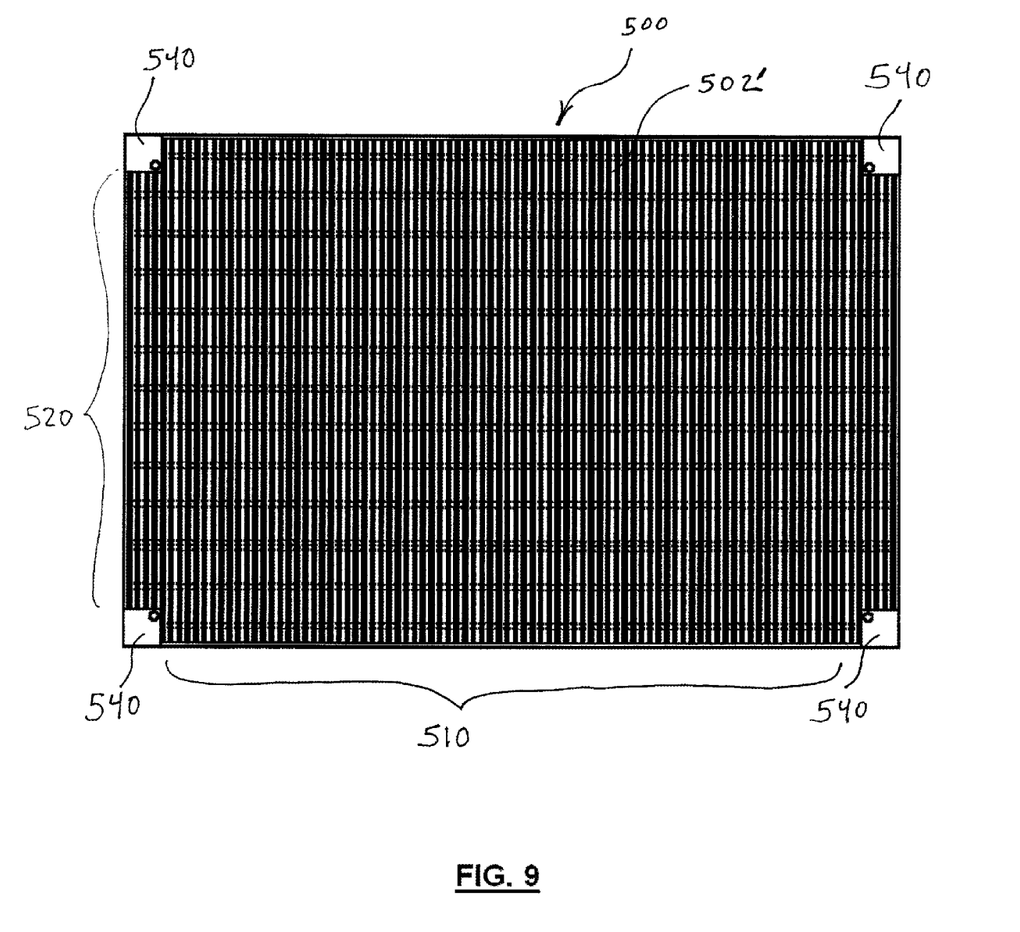
FIG. 9 is a plan view of an alternative embodiment of the screen portion of the oscillating flow platform in FIG. 1.

It should be appreciated that for some varieties of grapes it has been discovered that the orientation of the rectangular slots 502' in screen 500, as shown in FIG. 9, may be preferable for removing MOG and other undesirable components. Screen 500 has a rectangular frame 530. Inset and connected to each interior corner of frame 530 are four solid rectangular mounting corners 540. The remainder of the screen 500 within frame 530 is formed from an interconnected array of triangular shafts and wires that as in the embodiment of FIG. 5, to define the slots 502'. However, the array of triangular shafts and wires are now reversed in orientation with respect to the long and short sides of screen 500. That is the parallel array of shafts 510 is now oriented parallel to the short axis of screen 500 and the parallel array of wires is oriented in the transverse direction or parallel to the long axis of screen 500. The spacing between the shafts is less than that between the wires to orient the rectangular slots 502' with their longer axis parallel to the shorter side of screen 500.

While the invention has been described in connection with a preferred embodiment, it is not intended to limit the scope of the invention to the particular form set forth, but on the contrary, it is intended to cover such alternatives, modifications, and equivalents as may be within the spirit and scope of the invention as defined by the appended claims.

The invention claimed is:

1. A process for separating MOG from grapes, the process comprising the steps of:
   a) providing a oscillating conveyor having a first section with a sealed bottom and a second section with a screened bottom, wherein the oscillating conveyer is disposed to convey material over the first section to the second section, said oscillating conveyer including vibration reduction means,
   b) initiating the oscillating motion of the conveyer,
   c) depositing the grapes and MOG on the first section of the conveyer, collecting the grapes that pass over the second section of the conveyer, whereby a substantial portion of the MOG is separated from the grape berries by falling through the screen bottom as the mixture is conveyed from the first section of the oscillating conveyer past the second section of the oscillating conveyer, wherein the screened bottom comprises;
      i) a first parallel array of triangular shafts, each shaft oriented so that the sides define an upper plane,
      ii) a second parallel array of wires cross-connecting and stabilizing said array of triangular shafts,
      iii) wherein said second parallel array of wires is connected to each of the triangular shafts of said first parallel array near the apex thereof, opposite the side that defines a portion of the upper plane.

2. A process for separating MOG from grapes according to claim 1 wherein the oscillating conveyer further comprises a catch basin disposed below the screen of the second section.

3. A process for separating MOG from grapes , the process comprising the steps of:
   a) providing a oscillating conveyor having a first section with a sealed bottom and a second section with a screened bottom, wherein the oscillating conveyer is disposed to convey material over the first section to the second section, said oscillating conveyer including vibration reduction means, b) initiating the oscillating motion of the conveyer, c) depositing the grapes and MOG on the first section of the conveyor, d) collecting the grapes that pass over the second section of the conveyor, whereby a substantial portion of the MOG is separated from the grape berries by falling through the screen bottom as the mixture is conveyed from the first section of the oscillating conveyer past the second section of the oscillating conveyer and further comprising the step of separating a majority of the stems from the grapes prior to said step of depositing the grapes and MOG on the first section of the conveyor.

4. A process for separating MOG from grapes according to claim 3 wherein the oscillating conveyer further comprises a catch basin disposed below the screen of the second section.

5. A process for separating MOG from grapes the process comprising the steps of:

a) providing a oscillating conveyor having a first section with a sealed bottom and a second section with a screened bottom, wherein the oscillating conveyer is disposed to convey material over the first section to the second section, said oscillating conveyer including vibration reduction means, b) initiating the oscillating motion of the conveyer, c) depositing the grapes and MOG on the first section of the conveyor, collecting the grapes that pass over the second section of the conveyor, whereby a substantial portion of the MOG is separated from the grape berries by falling through the screen bottom as the mixture is conveyed from the first section of the oscillating conveyer past the second section of the oscillating conveyer wherein the oscillating conveyer further comprises a catch basin disposed below the screen of the second section, wherein the oscillating conveyer further comprises a funnel trough disposed below the screen of the second section for directing matter separated by the screen into the catch basin d) wherein the catch basin of the oscillating conveyer comprises a secondary screen disposed at the bottom thereof.

6. A process for separating MOG from grapes according to claim 5 wherein the oscillating conveyer further comprises a secondary trough disposed below the catch basin for collected liquid separated by said secondary screen.

7. A process for separating MOG from grapes according to claim 6 wherein the secondary trough has a substantially solid bottom surface that tapers toward a drain hole and further comprising the step of withdrawing grape juice through the drain hole.

8. A process for separating MOG from grapes, the process comprising the steps of:

a) providing an oscillating flow separator comprising:
  i) a support stand,
  ii) a substantially rectangular trough open at the top and enclosed by three substantially upright sides, said trough having a first open side on one of the shorter sides of the rectangle for dispensing purified solid matter, and a first closed side opposite the first open side,
  iii) a screen disposed on the bottom of said trough,
  iv) four parallel legs connecting said trough to said support stand by rotating pivotal members to allow said trough to oscillate with respect to said support stand wherein the first open side of said trough is disposed below the first closed side such that matter to be purified flows over said screen,
  v) a motor having an axial shaft mounted on said support stand,
  vi) a drive belt having a first and second end, the first end wrapped in axial communication with the axial shaft of said motor,
  vii) a drive shaft mounted on said support stand, wherein the second end of said drive belt is wrapped in axial communication around said drive shaft to rotate said drive shaft via said motor,
  viii) a cam wheel surrounding said drive shaft wherein the center of gravity thereof is disposed off-axis with respect thereto,
  ix) a cam follower engaging said cam at a first end and engaging said rectangular trough at a second end via a rotating member wherein said cam follower causes the oscillation of said trough in response to the rotation of said motor,
  x) wherein said drive shaft further comprises counterweights disposed there around and displaced off-axis in the substantially the opposite direction as the center of gravity of said cam, whereby the vibration of said support stand is reduced by said counterweights, b) energizing the motor to initiate the oscillation of the substantially rectangular trough, c) depositing the grapes and MOG in the substantially rectangular trough at the first closed side thereof, d) collecting the grapes that exit the first open side of the substantially rectangular trough, whereby a substantial portion of the MOG is separated from the grape berries by falling through the screen bottom as the mixture is conveyed across the substantially rectangular trough.

9. A process for separating MOG from grapes according to claim 8 and further comprising the step of separating a majority of the stems from the grapes prior to said step of depositing grape berries and MOG.

10. A process for separating MOG from grapes according to claim 8 wherein the oscillating flow separator further comprises a catch basin disposed below the screen of said substantially rectangular trough.

11. A process for separating MOG from grapes according to claim 10 wherein the oscillating flow separator further comprises a funnel trough disposed below the screen of said substantially rectangular trough for directing matter separated by the screen into said catch basin.

12. A process for separating MOG from grapes according to claim 11 wherein the catch basin comprises a secondary screen disposed at the bottom thereof.

13. A process for separating MOG from grapes according to claim 12 wherein the oscillating flow separator further comprises a secondary trough disposed below said catch basin for collected liquid separated by said secondary screen.

14. A process for separating MOG from grapes according to claim 13 wherein the secondary trough has a substantially solid bottom surface that tapers toward a drain hole.

15. A process for separating MOG from grapes the process comprising:

a) providing an oscillating flow separator having a substantially rectangular oscillating trough that comprises:
  i) a bottom,
  ii) a first at least partially open shorter side pointed downward to dispense matter purified by the separator,
  iii) two substantially upright surrounding sides orthogonal to and longer than the first open shorter side, iv) a first closed short side that is opposite the first open side and is pointed upward,
v) an aperture in a portion of the bottom of the trough,
vi) a screen covering said aperture,
b) initiating the oscillating motion of the substantially rectangular trough,
c) depositing the grapes and MOG in the substantially rectangular trough at the first closed short side,
d) collecting the grapes that pass over the screen at the first open short side,
e) removing the MOG that falls through the screen at the bottom of the substantially rectangular trough
f) wherein the top side of the screen disposed parallel to the first closed short side of the trough is disposed slightly below the adjacent bottom of the trough.

16. A process for separating MOG from grapes according to claim 15 wherein the bottom side of the screen disposed parallel and adjacent to the first open short side of the trough is disposed slightly above the adjacent bottom of the trough.

* * * * *